United States Patent
Dittrich

(10) Patent No.: US 9,009,469 B2
(45) Date of Patent: Apr. 14, 2015

(54) SYSTEMS AND METHODS FOR SECURING DATA IN A CLOUD COMPUTING ENVIRONMENT USING IN-MEMORY TECHNIQUES AND SECRET KEY ENCRYPTION

(71) Applicant: SAP AG, Walldorf (DE)

(72) Inventor: Wolfgang Dittrich, Heidelberg (DE)

(73) Assignee: SAP SE, Walldorf (DE)

( * ) Notice: Subject to any disclaimer, the term of this patent is extended or adjusted under 35 U.S.C. 154(b) by 153 days.

(21) Appl. No.: 13/741,659

(22) Filed: Jan. 15, 2013

(65) Prior Publication Data

US 2014/0201524 A1 Jul. 17, 2014

(51) Int. Cl.
- *G06F 21/00* (2013.01)
- *G06F 21/45* (2013.01)
- *G06F 17/30* (2006.01)
- *H04L 29/06* (2006.01)

(52) U.S. Cl.
CPC ............... *G06F 21/45* (2013.01); *G06F 17/30* (2013.01); *H04L 63/0435* (2013.01); *H04L 63/14* (2013.01); *H04L 2463/062* (2013.01)

(58) Field of Classification Search
CPC .......... G06F 21/00; G06F 21/62; G06F 21/92
USPC ......................................................... 713/165
See application file for complete search history.

(56) References Cited

U.S. PATENT DOCUMENTS

| | | | |
|---|---|---|---|
| 5,845,066 A | 12/1998 | Fukuzumi | |
| 6,243,813 B1 | 6/2001 | Kong | |
| 7,340,680 B2 | 3/2008 | Becker | |
| 7,706,401 B2 | 4/2010 | Bae et al. | |
| 7,861,095 B2 | 12/2010 | Varma et al. | |
| 8,261,081 B2 | 9/2012 | McLeod | |
| 8,281,368 B2 | 10/2012 | Malpani et al. | |
| 8,285,985 B2 | 10/2012 | Klein | |
| 8,306,920 B1 | 11/2012 | Lynch | |
| 8,321,682 B1 | 11/2012 | Read et al. | |
| 2007/0022289 A1 | 1/2007 | Alt et al. | |
| 2007/0255675 A1* | 11/2007 | Fuzell-Casey et al. | ........... 707/1 |
| 2010/0114964 A1 | 5/2010 | Kerschbaum et al. | |
| 2012/0011149 A1 | 1/2012 | Zurek | |

(Continued)

OTHER PUBLICATIONS

Rocha et al., "The Final Frontier: Confidentiality and Privacy in the Cloud", 2011, IEEE Computer Society, pp. 44-50.*

(Continued)

*Primary Examiner* — Matthew Smithers
(74) *Attorney, Agent, or Firm* — Fountainhead Law Group PC

(57) ABSTRACT

In one embodiment, a computer-implemented method comprises determining, by a controller, whether a first data store is in an initialization mode. The first data store stores client data. A second data store stores credential data of the first user and credential data of a second user. An application server includes a first secret key store. An in-memory database server includes a second secret key store. The method further comprises, if the first data store is in the initialization mode, receiving, by the controller, from the second user a secret key for encrypting the client data stored in the first data store; and storing, in the first key store, the secret key. The method further comprises, in an operational mode, authenticating the first user based on the credential data of the first user; if the first user is authenticated, processing, in the application server, a user request from the first user.

20 Claims, 6 Drawing Sheets

(56) References Cited

U.S. PATENT DOCUMENTS

| | | | |
|---|---|---|---|
| 2012/0210118 A1 | 8/2012 | Chaves et al. | |
| 2012/0226792 A1 | 9/2012 | Johnson et al. | |
| 2012/0239942 A1* | 9/2012 | Yan | 713/189 |
| 2013/0311785 A1* | 11/2013 | Ignatius et al. | 713/189 |
| 2014/0082749 A1* | 3/2014 | Holland et al. | 726/29 |
| 2014/0095881 A1* | 4/2014 | Chan et al. | 713/171 |
| 2014/0165202 A1* | 6/2014 | Mattsson | 726/23 |

OTHER PUBLICATIONS

Pagan et al., "Using In-Memory Encrypted Databases on the Cloud", 2011, IEEE, pp. 30-37.*

Waqar et al., "User Privacy Issues in Eucalyptus: A Private Cloud Computing Environment", 2011, IEEE Computer Society, pp. 927-932.*

* cited by examiner

SYSTEMS AND METHODS FOR SECURING DATA IN A CLOUD COMPUTING ENVIRONMENT USING IN-MEMORY TECHNIQUES AND SECRET KEY ENCRYPTION

BACKGROUND

The present invention relates to computing, and in particular, to systems and methods for securing data in a cloud computing environment using in-memory techniques and secret key encryption.

Cloud service providers provide data processing or storage services to their clients in a cloud environment. The cloud service providers typically operate, in their information technology datacenters, system landscapes that include application servers (such as short application servers) and database management servers (such as short database servers). The cloud clients expect high security standards for all datacenters system. The cloud service clients often require that system administrators of the cloud service provider be unable to read or write, even accidentally, client data that is stored on external storage. For example, the cloud service client may desire to restrict access to employee data or business critical data.

One problem associated with cloud service providers is that accessibility of data by administrators of the cloud service provider. It is generally desirable to prevent access of client data by those not having a need to access the data. Consequently, there exists a need for improved systems and methods for protecting client data.

SUMMARY

Embodiments of the present invention include systems and methods for securing client data in a cloud computing environment using in-memory techniques and secret key encryption. In one embodiment, the present invention includes a computer-implemented method comprising determining, by a controller, whether a first data store is in an initialization mode. The first data store stores client data. A second data store stores credential data of the first user and credential data of a second user. An application server includes a first secret key store. An in-memory database server includes a second secret key store. The method further comprises, if the first data store is in the initialization mode, receiving, by the controller, from the second user a secret key for encrypting the client data stored in the first data store; and storing, in the first key store, the secret key.

In one embodiment, the method further comprises storing the secret key in the second secret key store, and setting the first data store to an operational mode.

In one embodiment, the method further comprises receiving, in the controller, credential information from the second user during the initialization mode; and authenticating, in the controller, the second user based on credential information and the credential data of the second user stored in the second data store, wherein said receiving, by the controller, from the second user a secret key for encrypting the client data stored in the first data store, and said storing, in the first key store, the secret key if the second user is authenticated, is not performed unless the second user is authenticated.

In one embodiment, the method further comprises receiving, in the controller, a user request from the first user during the operational mode; authenticating, in the controller, the first user based on the credential data of the first user stored in the second data store; if the first user is authenticated, processing, in the application server, the user request; determining, in the application server, whether the user request is to be executed by the in-memory database server; if the user request is to be executed by the in-memory database server, encrypting the user request using the secret key, and communicating the encrypted user request to the in-memory database server; and otherwise, if the user request is not to be executed by the in-memory database server, executing, in the application server, the second user request.

In one embodiment, the method further comprises if the user request is to be executed by the in-memory database server, decrypting, in the in-memory database server, the encrypted user request using the secret key; processing, in the in-memory database server, the user request; determining, in the in-memory database server, whether the user request is a data communication with the first data store; if the user request is a data communication with the first data store, encrypting the user request using the secret key, and communicating the encrypted user request to first data store; and otherwise, if the user request is not a data communication with the first data store; executing, in the in-memory database server, the user request, and encrypting, using the secret key, a response for communication to the application server.

In one embodiment, the method further comprises encrypting, in the in-memory database server, a response to the first user using the secret key via the application server using the secret key.

In one embodiment, the method further comprises encrypting, in the application server, using the secret key, data sent from the application server to the in-memory database server; encrypting, in the in-memory database server, using the secret key, data sent from the in-memory database server to the application server or the first data store; decrypting, in the application server, using the secret key, data sent to the application server from the in-memory database server; and decrypting, in the in-memory database server, using the secret key, data sent to the in-memory database server from the application server or the first data store.

In one embodiment, the method further comprises detecting a loss of the secret key in the first key store or in the second key store; receiving, in the controller, a second user request from the second user; receiving, by the controller, a copy of the secret key; and storing, in the first key store and the second key store, the copy of the secret key.

In another embodiment, the present invention includes a computer readable medium embodying a computer program for performing a method and embodiments described above.

In another embodiment, the present invention includes a computer system comprising one or more processors implementing the techniques described herein. For example, the system includes a controller that determines whether a first data store is in an initialization mode. The first data store stores client data. A second data store stores credential data of the first user and credential data of a second user. An application server includes a first secret key store. An in-memory database server includes a second secret key store. If the first data store is in the initialization mode, the controller receives from the second user a secret key for encrypting the client data stored in the first data store, and stores the secret key in the first key store.

In another embodiment, the controller further stores the secret key in the second secret key store, and sets the first data store to an operational mode.

In another embodiment, the controller further receives credential information from the second user during the initialization mode, and authenticates the second user based on credential information and the credential data of the second user stored in the second data store. The controller receiving from the second user a secret key for encrypting the client data stored in the first data store, and storing the secret key in the first key store is not performed unless the second user is authenticated.

In another embodiment, the controller further receives a user request from the first user during the operational mode; authenticates the first user based on the credential data of the first user stored in the second data store. If the first user is authenticated, the controller further processes the user request, and determines whether the user request is to be executed by the in-memory database server. If the user request is to be executed by the in-memory database server, the controller encrypts the user request using the secret key, and communicates the encrypted user request to the in-memory database server, and otherwise, if the user request is not to be executed by the in-memory database server, the controller executes the user request.

The following detailed description and accompanying drawings provide a better understanding of the nature and advantages of the present invention.

DETAILED DESCRIPTION

Described herein are techniques for securing data in a cloud computing environment using in-memory techniques and secret key encryption. The apparatuses, methods, and techniques described below may be implemented as a computer program (software) executing on one or more computers. The computer program may further be stored on a computer readable medium. The computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
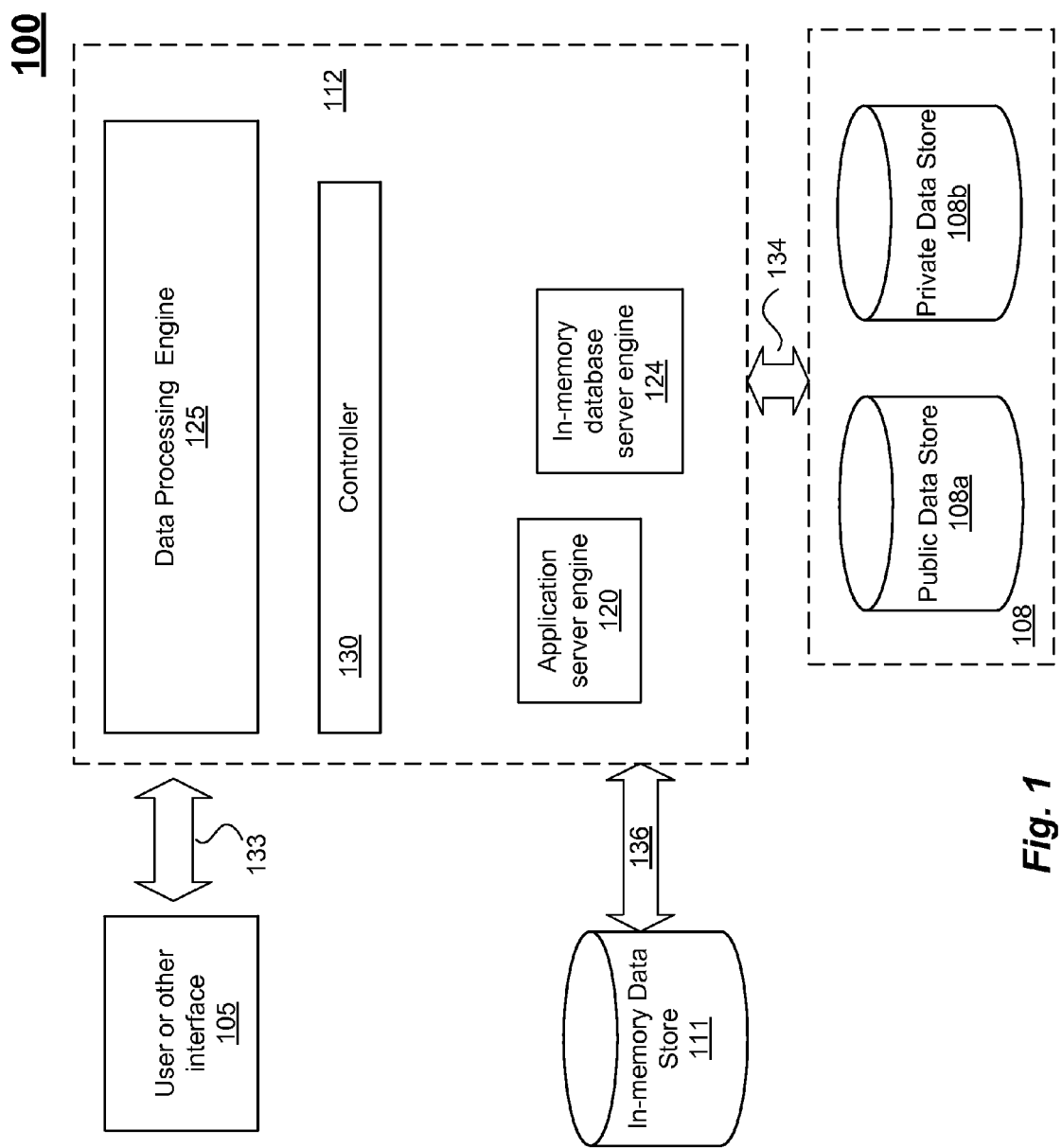
FIG. 1 is a schematic representation of a system for securing data in a cloud computing environment using in-memory techniques and secret key encryption according to an embodiment of the present invention.

FIG. 1 is a schematic representation of a system 100 for securing data in a cloud computing environment using in-memory techniques and secret key encryption according to an embodiment of the present invention. System 100 restricts access to data by parties other than a master administrator and defined users. In some embodiments, administrators of a cloud service provider are prevented from being able to read client data by directly accessing the database and file system (even by those using database administration tools) or by eavesdropping on network traffic in to system 100. System 100 includes a user or other interface 105, a warehouse data store 108, an in-memory data store 111, and a data protection system 112. Warehouse data store 108 may comprise one or more warehouse data stores. For clarity and simplicity, only two warehouse data stores (i.e., public data store 108a and private data store 108b) are shown. In-memory data store 111 may comprise one or more in-memory data stores and one or more secret key stores (see FIG. 3). In various embodiments, in-memory data store 111 is a volatile memory that stores data from warehouse data store 108 and from secret key stores during operation of system 100, and the contents of in-memory data store 111 are erased after operation of system 100. In various embodiments, warehouse data store 108, and in-memory data store 111 are located at or under physical control by a cloud service provider. Data protection system 112 comprises an application server engine 120, an in-memory database server engine 124, a data processing engine 125, and a controller 130.

Information is conveyed between user interface 105, data stores 108 and 111, and data protection system 112, along data flow paths 133, 134, and 136. For example, data protection system 112 accesses the contents of warehouse data store 108 and in-memory database 111 over data flow paths 134 and 136, respectively, when generating running queries or changing data in warehouse data store 108.

Application server engine 120 executes a process or algorithm that runs an application, such as an application provided by a service provider or processes or analyzes data stored in warehouse data store 108. The application may be, for example, an ERP (Enterprise Resource Planning) software application. In-memory database server engine 124 executes a process or algorithm that processes or analyzes data stored in in-memory data store 111.

Data processing engine 125 executes a process or algorithm that analyzes data sets or performs instructions from application server engine 120, and analyzes data sets or performs instructions from in-memory database server engine 124. In some embodiments, data processing engine 125 includes any or all of application server engine 120 and in-memory database server engine 124. In various embodiments, communication between application server engine 120 and in-memory database server engine 124 is encrypted. In various embodiments, communication between in-memory database server engine 124 and private data store 108b is encrypted.

User or other interface 105 is a collection of one or more data input/output devices for interacting with a human user or with another data processing system to receive and output data. For example, interface 105 can be a presentation system, one or more software applications, or a data communications gateway, for example. User interface 105 may receive user requests from, for example, the master administrator or regular users. Data output over interface 105 can present the results of data processing activities in system 100. For example, data flow path 133 can convey the results of queries or other operations performed on data protection system 112 for presentation on a monitor or a data communications gateway. In the description below, a master administrator uses user interface 105 that differs from user interface 105 used by regular users and other administrators of the client. User interface 105 interfaces with a browser.

Warehouse data store 108 is a collection of information that is stored at one or more data machine readable storage devices (e.g., data stores). Warehouse data store 108 may be a single data store or multiple data stores, which may be coupled to one or more software applications for storing application data. Warehouse data store 108 stores the information in one or more models. Warehouse data store 108 may store data as a plurality of data records. Each data record comprises a plurality of data elements (e.g., fields of a record). Warehouse data store 108 may include different structures and their relations (e.g., databases, data store tables, data records, fields, and foreign key relations). Additionally, different structures and fields may include data types, descriptions, or other metadata, for example, which may be different for different models. Data flow path 134 conveys information describing changes to data stored in warehouse data store 108 between data protection system 112 and warehouse data store 108. Such changes include the insertion, deletion, and modification of all or a portion of the contents of one or more warehouse data stores. Public data store 108a may store client data, such as security credentials of a master administrator of a client, configuration data of the client, and user credentials of users of the client. Private data store 108b stores client data that may be encrypted with a key known to a master administrator. In various embodiments, the data store 108 has limited physical access by people associated with the entity controlling the data store 108. Public data store 108a stores data that administrators of the service provider may access. Private data store 108b stores data that is encrypted and is accessible only by users of the client who have the proper credentials when the system is in an operational mode.

Data protection system 112 is a collection of data processing activities (e.g., one or more data analysis programs or methods) performed in accordance with the logic of a set of machine-readable instructions. The data processing activities can include running queries on the contents of the warehouse data store 108 that may be stored in in-memory data store 111. Interface 105 can, in turn, render the result sets over an output device for a human or other user or to other systems.

Queries, instructions or requests from the data processing engine 125 may be received by controller 130. Controller 130 may be a component on the same system as a data warehouse or part of a different system and may be implemented in hardware, software, or as a combination of hardware and software, for example. Controller 130 receives a query from data processing engine 125 and generates a request based on the received query against warehouse data store 108.

Controller 130 receives data from one or both of warehouse data store 108 and in-memory data store 111 in response to the request. In responding to the query from data processing engine 125, controller 130 may communicate the data from warehouse data store 108.

Figure 2:
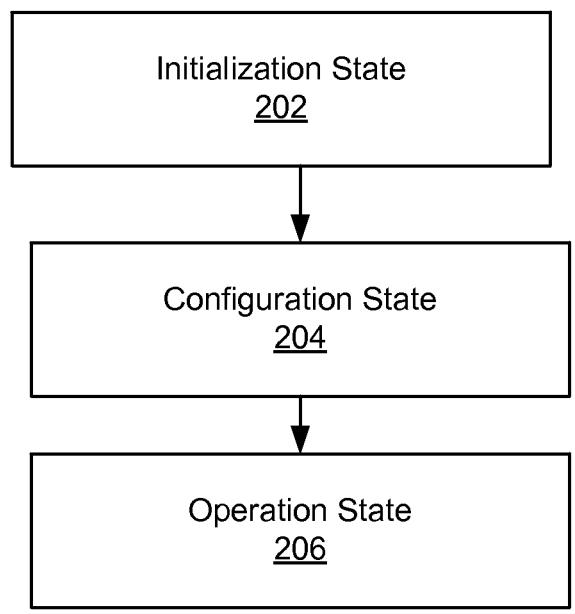
FIG. 2 illustrates a process for data protection according to an embodiment of the present invention.

FIG. 2 illustrates a process for data protection according to an embodiment of the present invention. At 202, data protection system 112 is in an initialization state. Data protection system 112 does not know the secret key. Warehouse data store 108 and in-memory data store 111 are not encrypted. Further, private data store 108b is empty. Initial customizing data, such as credentials of the master administration, are stored in public data store 108a. Data protection system 112 executes the initialization state as described in conjunction with FIG. 3. In some embodiments, in the initialization state, system 100 can only be used by the master administrator, and system 100 generates a service denied response to regular users and external systems.

At 204, data protection system 112 is in a configuration state. System 100 does not know the secret key, and private data store 108b is encrypted. For example, a reboot of system 100 may cause system 100 to empty the storage of the secret key. Data protection system 112 executes the configuration state as described in conjunction with FIG. 4. In the configuration state, system 100 can be used only by the master administrator, and system 100 generates a service denied response to regular users and external systems. The master administrator and regular users are part of, or under the control of, the client of the cloud service provider. In this state, private data store 108b is encrypted using the client specific private key.

At 206, data protection system 112 is in an operational state. The users may use system 100. System 100 knows the secret key. Private data store 108b has been encrypted using the user specific private key.

Figure 3:
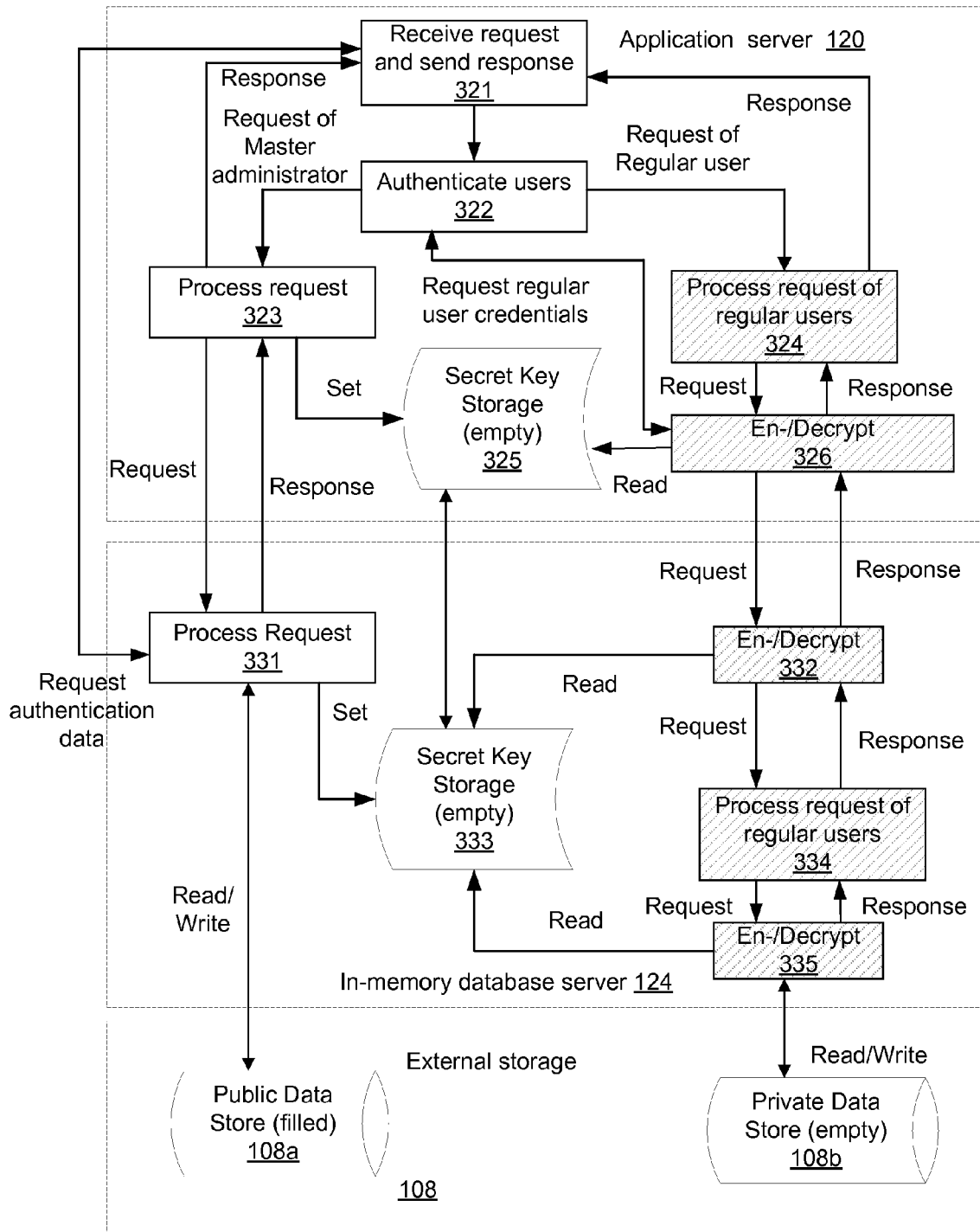
FIG. 3 illustrates a process of an initialization state of FIG. 2 according to an embodiment of the present invention.
Figure 4:
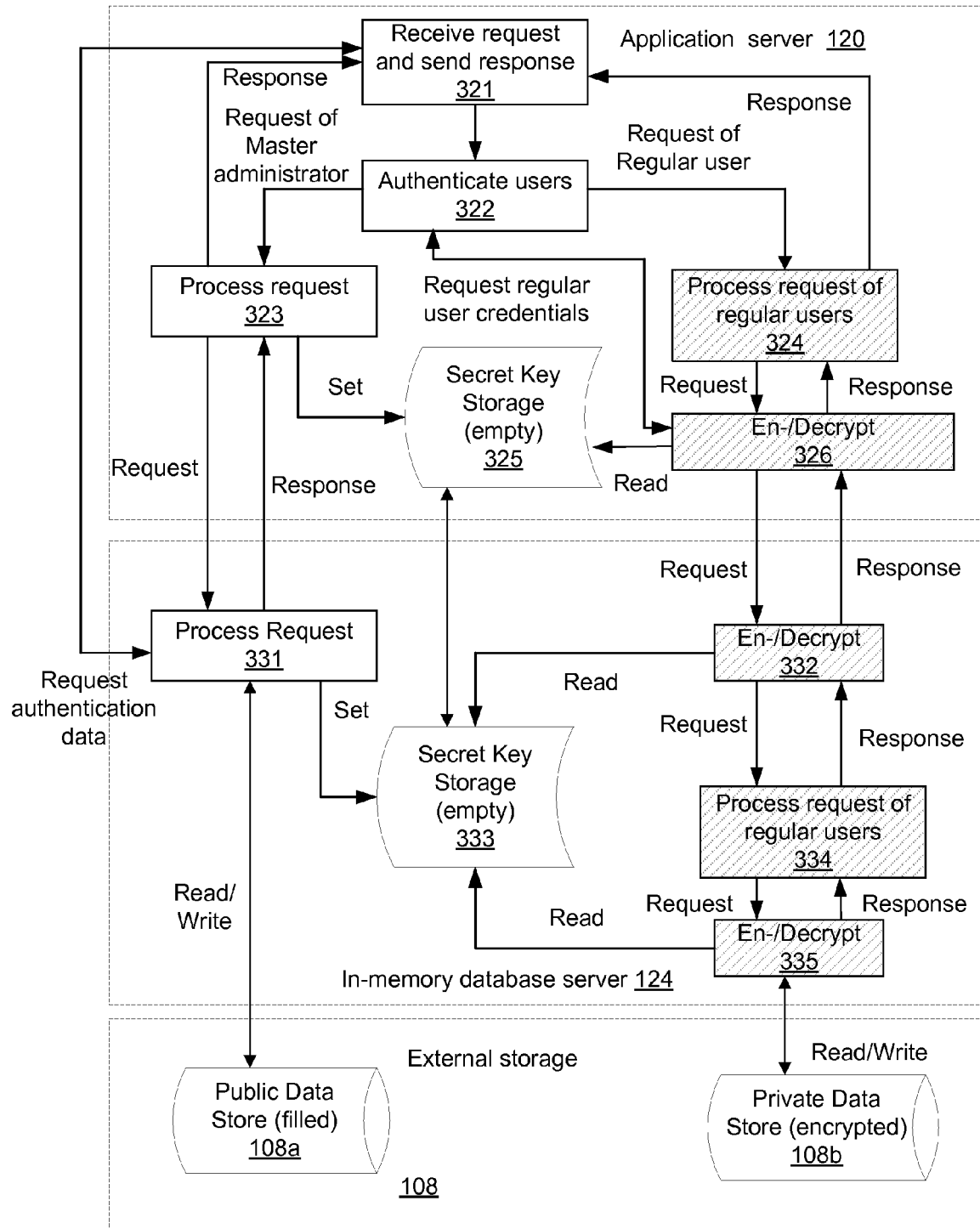
FIG. 4 illustrates a process of a configuration state of FIG. 2 according to an embodiment of the present invention.

FIG. 3 illustrates a process of the initialization state at 202 (FIG. 2). It is noted that FIG. 3 also shows the configuration state at 204 (FIG. 2), which is described below in conjunction with FIG. 4, and also shows the operation state at 206 (FIG. 2), which is described below in conjunction with FIG. 5. The inactive processes are shown in FIGS. 3-4 with cross hatched lines. Data stores and memory storage are labeled based on state or usage (e.g., filled, empty or encrypted).

At 321, application server engine 120 receives log in request from a master administrator from user interface 105. At 322, application server engine 120 authenticates the master administrator using the initial credentials stored in the public data store 108a. In one embodiment, the initial logon credentials of the master administrator who will be the initial user to login in for a client are stored in public data store 108a, and are provided to the master administrator by the cloud service provider; these initial logon credentials are used to authenticate the first logon of the master administrator. After the initial logon, the master administrator changes the credentials for use in subsequent logons, and the changed credentials are stored in public data store 108a.

At 323, application server engine 120 requests new user credentials and a new secret key to be used for encrypting private data store 108b.

At 331, in-memory database server engine 124 stores the new user credentials in public data store 108a. In various embodiments, the master administrator credentials are stored using standard encryption techniques.

At 323, application server engine 120 sets a secret key storage 325 to store the secret key. The secret key provided by the master administrator (and requested by the application server engine 120 at 323) is stored in secret key storage 325 and used later on. Further, at 331, in-memory database server engine 124 sets a secret key storage 333 to store the secret key by an exchange between application server engine 120 and in-memory database server engine 124, using, for example, an Internet Protocol Security connection.

At 331, in-memory database server engine 124 read and writes data such user credentials in public data store 108a, and stores the secret key in secret key storage 333 in the operational mode at 206 (FIG. 2). Private data store 108b is encrypted using the secret key that is known only to the master administrator, and system 100 is in operational mode 206 (FIG. 2). In some embodiments, the initialization process is done only once.

In various embodiments, secret key storage 325 and secret key storage 333 and private data store 108b are user specific. Secret key storage 325 and secret key storage 333 may be organized as a hash table using a client identifier as key. System 100 may allow multiple users using various multi-tenant techniques. For example, client specific tenant identifier may be added to each primary key of each table. Data protection system 112 may identify the user either using a unique uniform resource locator when accessing the data protection system 112 or by a parameter set to a user specific value. Application server engine 120 provides the client identity to in-memory database server engine 124 to select the correct data store 108.

FIG. 4 illustrates a process of the configuration state at 204 (FIG. 2). At 321, application server engine 120 receives a log in request from the master administrator from user interface 105. The log in request includes the credentials stored in public data store 108*a*, which are stored using the process described above for the initiation step 202. No other user can log on because system 100 is not able to access the user data stored in the encrypted data storage.

At 322, application server engine 120 requests the master administrator to enter the secret encryption key.

At 323, application server engine 120 sets secret key storage 325 to store the secret key. Further, at 331, in-memory database server engine 124 sets secret key storage 333 to store the secret key by an exchange between application server engine 120 and in-memory database server engine 124. System 100 is now in operational state 206 (FIG. 2), and can be used by regular users.

Figure 5:
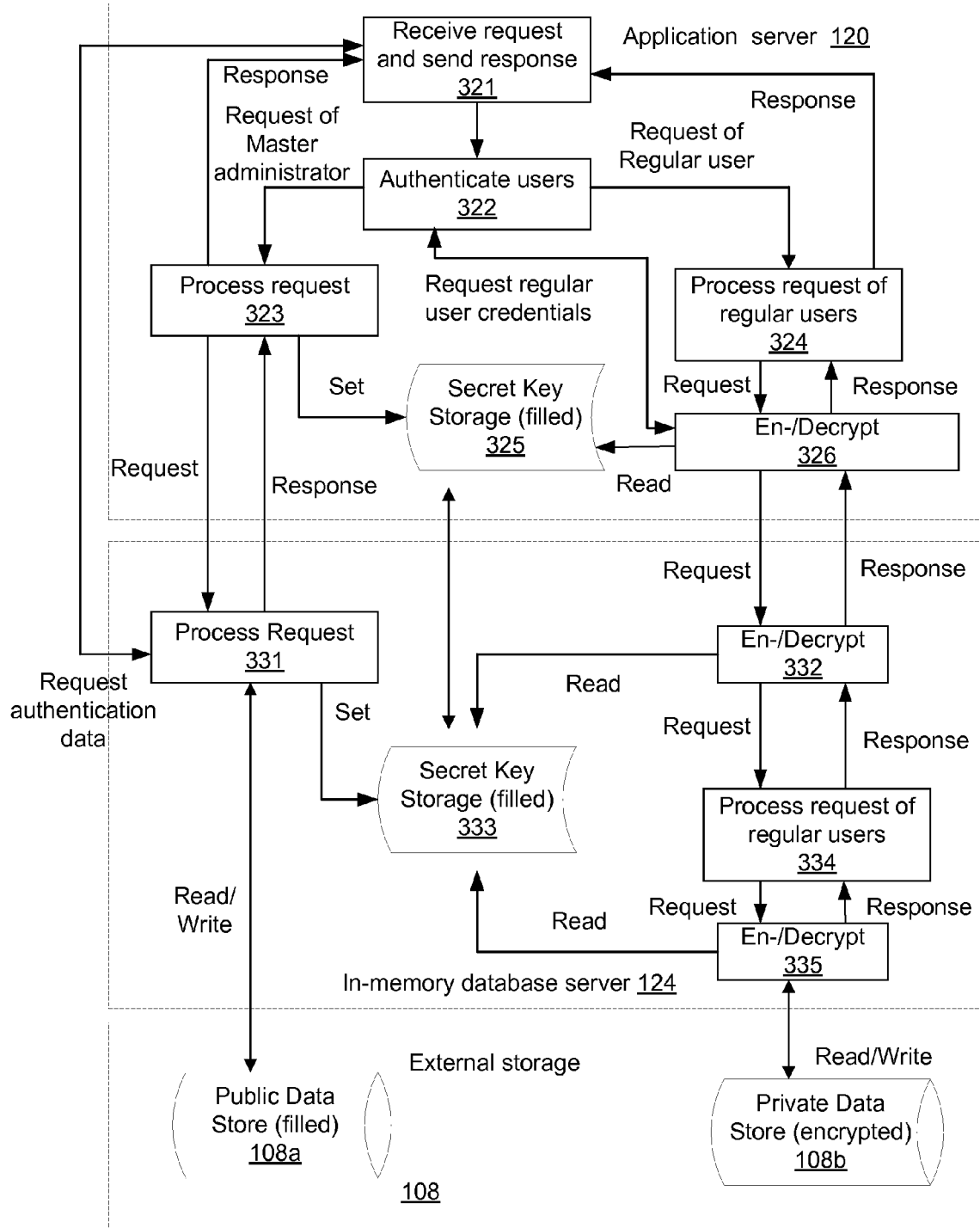
FIG. 5 illustrates a process of an operational state of FIG. 2 according to an embodiment of the present invention.

FIG. 5 illustrates a process of the operational state at 206 (FIG. 2). The master administrator or a regular user may use system 100. The process of FIG. 5 is first described for regular users, which includes all administrators of the client, except the master administrator.

At 321, application server engine 120 receives a log in request from the regular user from user interface 105. The log in request includes credentials.

At 322, application server engine 120 authenticates the regular user by validating the credentials stored in public data store 108*a*. At 322, application server engine 120 requests the secret key from secret key store 333, and, at 326, encrypts the request. In one embodiment, the initial logon credentials of regular users are set by either the master administrator or the cloud service provider and are stored in public data store 108*a*, and are provided to the regular users by the master administrator or the cloud service provider; these initial logon credentials are used to authenticate the first logon of the regular users. After the initial logon, the regular user changes the credentials for subsequent logons, and the changed credentials are stored in public data store 108*a*.

At 332, in-memory database server engine 124 decrypts the request, and, at 334, in-memory database server engine 124 processes the request. At 335, in-memory database server engine 124 encrypts the request, and reads the credential stored in secret key storage 333. It is noted that communication between application server engine 120 and in-memory database server engine 124 for the regular user is encrypted, and decrypted within application server engine 120 and in-memory database server engine 124. At 335, in-memory database server engine 124 decrypts using the secret key stored in secret key storage 333, which is now filled. In-memory database server engine 124 exchanges the secret key with secret key storage 325 by an exchange between application server engine 120 and in-memory database server engine 124. Secret key storage 325 is now filled. At 322, application server engine 120 grants system access to the regular user who then is able to work with system 100.

In the operational state 206, all client data may be retrieved from the encrypted private data store 108*b*, and stored in in-memory data store 111. System 100 decrypts the encrypted data stored in the private data store 108*b* using the user specific secret key stored in the in-memory key storage 325 of application server engine 120 and in-memory key storage 333 of in-memory database server engine 124.

In the operational state 206, after authentication, at 321, application server engine 120 receives a request from the regular user from user interface 105. At 324, application server engine 120 processes the request of the regular user, and either, at 321, application server engine 120 responds, or at 326, application server engine 120 encrypts the request, and send the request to in-memory database server engine 124. At 332, in-memory database server engine 124 decrypts the request, and, at 334, in-memory database server engine 124 processes the request. At 334, in-memory database server engine 124 either responds to the request, which is encrypted at 332, or at 335, in-memory database server engine 124 encrypts the request, and reads or writes to private data store 108*b*. It is noted that communication between application server engine 120 and in-memory database server engine 124 for the regular user is encrypted, and decrypted within application server engine 120 and in-memory database server engine 124. At 335, in-memory database server engine 124 decrypts the read data, and at 334, in-memory database server engine 124 processes the request and sends a response for encryption at 334.

The process of FIG. 5 is next described for the master administrator. At 321, application server engine 120 receives a log in request from the master administrator from user interface 105. At 322, application server engine 120 authenticates the master administrator using the credentials stored in the public data store 108*a*.

After authentication, the master administrator can maintain other administrators of the client, such as user administrators. In various embodiments, system 100 requests the master administrator to enter the secret key as additional confirmation before allowing modifications. This prevents creation of administrators or regular users if the password of the master administrator has been compromised. The processes at 323 and 331 are described above for the master administrator.

Because the secret key is kept only in the in-memory data store 111, client data is encrypted on private data store 108*b*, and data is secured using a secure protocol or encrypted with the secret key, the administrator of the service provider lacks access to the client data, and cannot tamper with the client data.

In various embodiments, persistent client data in private data store 108*b* is encrypted using, for example, a symmetric encryption algorithm like Advanced Encryption Standard (AES) with a secret key known only to the client (here, the master administrator) and not the cloud service provider. Any decrypted client data and the secret key are stored at all point in time only in-memory data store 111. Communication of client data between application server 120 and in-memory database server 124 are encrypted either by Hypertext Transfer Protocol Secure (HTTPS)/Internet Protocol Security (IPsec) session keys or/and the client specific secret key or both.

In various embodiments, system 100 and the processes described in conjunction with FIGS. 2-5 may be used in conjunction with other security measures in order to prevent access to warehouse data store 108.

In various embodiments, system 100 may include password management tools or applications that are operated by the master administrator or regular user that stores appropriate passwords so that the master administrator does not need to manually enter the passwords.

Figure 6:
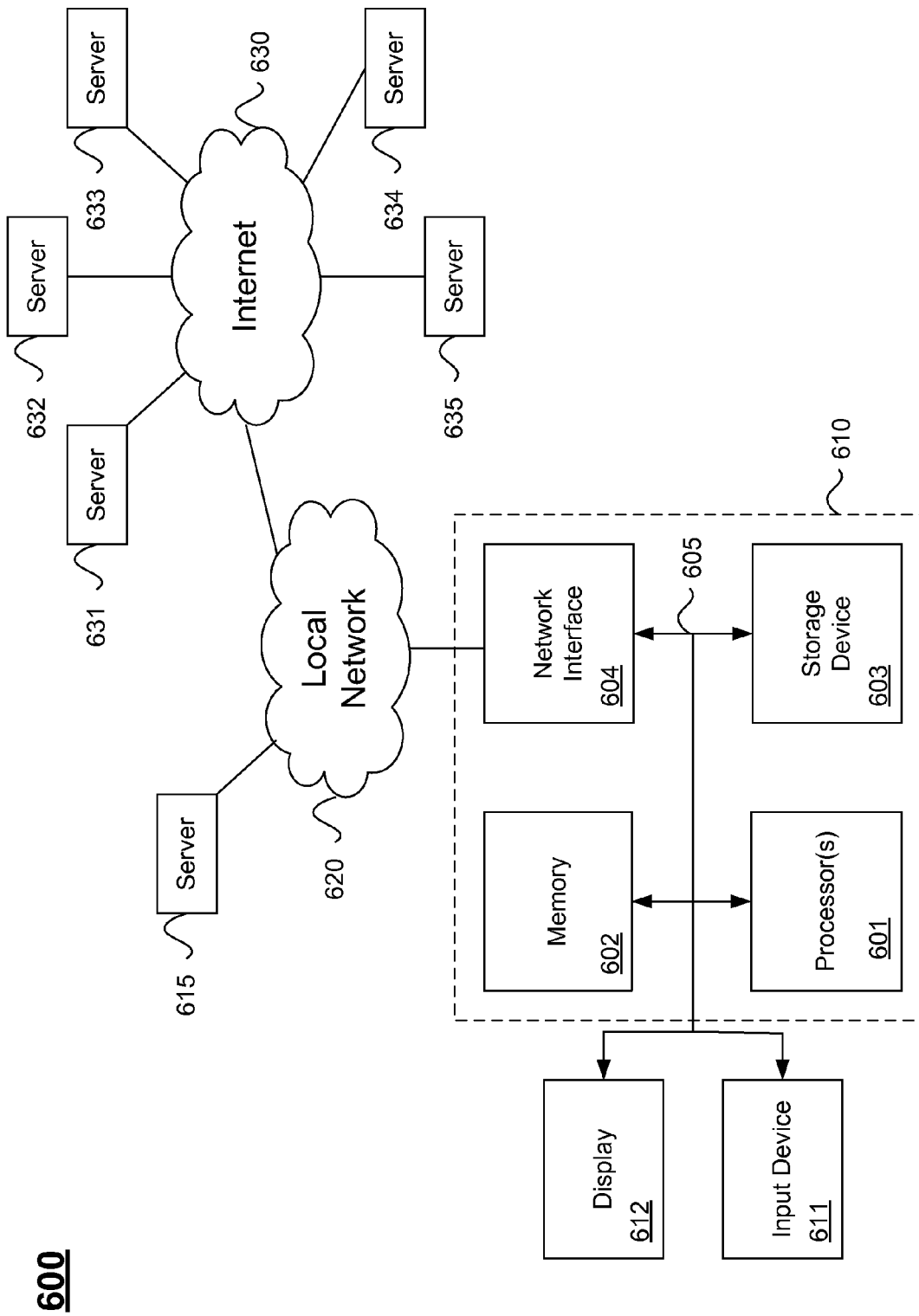
FIG. 6 illustrates hardware used to implement embodiments of the present invention.

FIG. 6 illustrates hardware used to implement embodiments of the present invention. An example computer system 610 is illustrated in FIG. 6. Computer system 610 includes a bus 605 or other communication mechanism for communicating information, and one or more processors 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A machine readable storage device 603 is also provided for storing information and instructions. Common forms of storage devices include, for example, a non-transitory electromagnetic medium such as a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device 603 and memory 602 are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system, and may include, for example, user interface 105. In some systems, bus 605 may be divided into multiple specialized buses.

Computer system 610 also includes a network interface 604 coupled with bus 605. Network interface 604 may provide two-way data communication between computer system 66 and the local network 620, for example. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may be programmed with processes described herein. In the Internet example, software components or services may reside on multiple different computer systems 610 or servers 631-635 across the network. Some or all of the processes described above may be implemented on one or more servers, for example. Specifically, warehouse data store 108 may be on one or more servers 615 and 631-635, for example. In-memory data store 111 may be on one or more servers 615 and 631-635. Data protection system 112 may be on computer system 610 or one or more servers 615 and 631-635, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   determining, by a controller, whether a first data store is in an initialization mode, wherein the first data store stores client data,
      wherein a second data store stores credential data of a first user and credential data of a second user, and
      wherein an application server includes a first secret key store, wherein an in-memory database server includes a second secret key store;
   if the first data store is in the initialization mode,
      receiving, by the controller, from the second user a secret key for encrypting the client data stored in the first data store; and
      storing, in the first key store, the secret key.

2. The method of claim 1, further comprising:
   storing the secret key in the second secret key store, and
   setting the first data store to an operational mode.

3. The method of claim 2, further comprising:
   receiving, in the controller, credential information from the second user during the initialization mode; and
   authenticating, in the controller, the second user based on credential information and the credential data of the second user stored in the second data store,
      wherein said receiving, by the controller, from the second user the secret key for encrypting the client data stored in the first data store, and said storing, in the first key store, the secret key if the second user is authenticated, is not performed unless the second user is authenticated.

4. The method of claim 2, further comprising:
   receiving, in the controller, a user request from the first user during the operational mode;
   authenticating, in the controller, the first user based on the credential data of the first user stored in the second data store;
   if the first user is authenticated,
      processing, in the application server, the user request;
      determining, in the application server, whether the user request is to be executed by the in-memory database server;
      if the user request is to be executed by the in-memory database server, encrypting the user request using the secret key, and communicating the encrypted user request to the in-memory database server; and
      otherwise, if the user request is not to be executed by the in-memory database server, executing, in the application server, the second user request.

5. The method of claim 4, further comprising:
   if the user request is to be executed by the in-memory database server,
      decrypting, in the in-memory database server, the encrypted user request using the secret key;
      processing, in the in-memory database server, the user request;
      determining, in the in-memory database server, whether the user request is a data communication with the first data store;

if the user request is a data communication with the first data store, encrypting the user request using the secret key, and communicating the encrypted user request to first data store; and otherwise, if the user request is not a data communication with the first data store; executing, in the in-memory database server, the user request, and encrypting, using the secret key, a response for communication to the application server.

6. The method of claim 5, further comprising:
encrypting, in the in-memory database server, a response to the first user using the secret key via the application server using the secret key.

7. The method of claim 4, further comprising:
encrypting, in the application server, using the secret key, data sent from the application server to the in-memory database server;
encrypting, in the in-memory database server, using the secret key, data sent from the in-memory database server to the application server or the first data store;
decrypting, in the application server, using the secret key, data sent to the application server from the in-memory database server; and
decrypting, in the in-memory database server, using the secret key, data sent to the in-memory database server from the application server or the first data store.

8. The method of claim 2, further comprising:
detecting a loss of the secret key in the first key store or in the second key store;
receiving, in the controller, a second user request from the second user;
receiving, by the controller, a copy of the secret key; and
storing, in the first key store and the second key store, the copy of the secret key.

9. A non-transitory computer readable medium embodying a computer program for performing a method, said method comprising:
determining, by a controller, whether a first data store is in an initialization mode,
wherein the first data store stores client data,
wherein a second data store stores credential data of a first user and credential data of a second user, and
wherein an application server includes a first secret key store, wherein an in-memory database server includes a second secret key store;
if the first data store is in the initialization mode,
receiving, by the controller, from the second user a secret key for encrypting the client data stored in the first data store; and
storing, in the first key store, the secret key.

10. The computer readable medium of claim 9, wherein the method further comprises:
storing the secret key in the second secret key store, and setting the first data store to an operational mode.

11. The computer readable medium of claim 10, wherein the method further comprises:
receiving, in the controller, credential information from the second user during the initialization mode;
authenticating, in the controller, the second user based on credential information and the credential data of the second user stored in the second data store,
wherein said receiving, by the controller, from the second user the secret key for encrypting the client data stored in the first data store, and said storing, in the first key store, the secret key if the second user is authenticated, is not performed unless the second user is authenticated.

12. The computer readable medium of claim 10, wherein the method further comprises:
receiving, in the controller, a user request from the first user during the operational mode;
authenticating, in the controller, the first user based on the credential data of the first user stored in the second data store;
if the first user is authenticated,
processing, in the application server, the user request;
determining, in the application server, whether the user request is to be executed by the in-memory database server;
if the user request is to be executed by the in-memory database server, encrypting the user request using the secret key, and communicating the encrypted second user request to the in-memory database server; and
otherwise, if the user request is not to be executed by the in-memory database server, executing, in the application server, the user request.

13. The computer readable medium of claim 12, wherein the method further comprises:
if the user request is to be executed by the in-memory database server,
decrypting, in the in-memory database server, the encrypted user request using the secret key;
processing, in the in-memory database server, the user request;
determining, in the in-memory database server, whether the user request is a data communication with the first data store;
if the user request is a data communication with the first data store, encrypting the user request using the secret key, and communicating the encrypted user request to first data store; and
otherwise, if the user request is not a data communication with the first data store; executing, in the in-memory database server, the user request, and encrypting, using the secret key, a response for communication to the application server.

14. The computer readable medium of claim 13, wherein the method further comprises:
encrypting, in the in-memory database server, a response to the first user using the secret key via the application server using the secret key.

15. The computer readable medium of claim 12, wherein the method further comprises:
encrypting, in the application server, using the secret key, data sent from the application server to the in-memory database server;
encrypting, in the in-memory database server, using the secret key, data sent from the in-memory database server to the application server or the first data store;
decrypting, in the application server, using the secret key, data sent to the application server from the in-memory database server; and
decrypting, in the in-memory database server, using the secret key, data sent to the in-memory database server from the application server or the first data store.

16. The computer readable medium of claim 10, wherein the method further comprises:
detecting a loss of the secret key in the first key store or in the second key store;
receiving, in the controller, a second user request from the second user;
receiving, by the controller, a copy of the secret key; and
storing, in the first key store and the second key store, the copy of the secret key.

17. A computer system comprising:
one or more processors;
a controller, the controller determines whether a first data store is in an initialization mode,
   wherein the first data store stores client data,
   wherein a second data store stores credential data of a first user and credential data of a second user, and
   wherein an application server includes a first secret key store, wherein an in-memory database server includes a second secret key store;
if the first data store is in the initialization mode, the controller:
   receives from the second user a secret key for encrypting the client data stored in the first data store; and
   stores the secret key in the first key store.

18. The computer system of claim 17, wherein the controller:
stores the secret key in the second secret key store, and
sets the first data store to an operational mode.

19. The computer system of claim 18, wherein the controller:
receives credential information from the second user during the initialization mode; and
authenticates the second user based on credential information and the credential data of the second user stored in the second data store,
   wherein said the controller receives from the second user the secret key for encrypting the client data stored in the first data store, and stores the secret key in the first key store is not performed unless the second user is authenticated.

20. The computer system of claim 18, wherein the controller:
receives a user request from the first user during the operational mode;
authenticates the first user based on the credential data of the first user stored in the second data store; and
if the first user is authenticated, the controller:
   processes the user request;
   determines whether the user request is to be executed by the in-memory database server;
   if the user request is to be executed by the in-memory database server, the controller encrypts the user request using the secret key, and communicates the encrypted user request to the in-memory database server; and
   otherwise, if the user request is not to be executed by the in-memory database server, the controller executes the user request.

* * * * *